Patented June 22, 1937

2,084,712

UNITED STATES PATENT OFFICE 2,084,712

INDIGOID DYESTUFFS AND PROCESS OF MAKING SAME

Ernst Stöcklin, Binningen, near Basel, and Eduard Kambli, Basel, Switzerland, assignors to the firm Society of Chemical Industry in Basle, Basel, Switzerland No Drawing. Application April 15, 1935, Serial No. 16,509. In Switzerland April 20, 1934

2 Claims. (Cl. 260—49)

This invention relates to the manufacture of indigoid dyestuffs of the formula

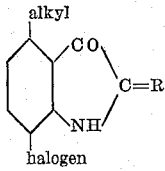

in which R represents the radical of an indigoid component, and in which the para-position to the imino-group may be substituted by halogen, by oxidizing an indoxyl of the general formula

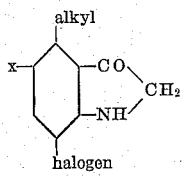

wherein $x$ is hydrogen or halogen, or by condensing such an indoxyl or the corresponding isatin and their reactive α-derivatives with a component suitable for making indigoid dyestuffs; in either case the dyestuff obtained may be halogenated by suitable means.

Indoxyls of the above general formula, the corresponding isatins and their reactive α-derivatives, are, for example, 4-methyl-7-chlorindoxyl, 4-methyl-7-bromindoxyl, 4-methyl-5:7-dichlorindoxyl, 4-methyl-5:7-dibromindoxyl, 4-methyl-5-chloro-7-bromindoxyl, 4-methyl-5-bromo-7-chlorindoxyl, 4-methyl-7-chlorisatin, 4-methyl-7-bromisatin, 4-methyl-5:7-dichlorisatin, 4-methyl-5:7-dibromisatin, 4-methyl-5-chloro-7-bromisatin, 4-methyl-5-bromo-7-chlorisatin, 4-methyl-7-chlorisatin - α - chloride, 4-methyl-7-chlorisatin-α-anilide, 4-methyl-7-bromisatin-α-chloride, 4-methyl-7-bromisatin-α-anilide, 4-methyl-5:7-dichlorisatin-α-chloride, 4-methyl-5:7-dichlorisatin-α-anilide, 4-methyl-5:7-dibromisatin - α - chloride, 4-methyl-5:7-dibromisatin-α-anilide, 4-methyl - 5 - chloro-7-bromisatin-α-chloride, 4-methyl-5-chloro-7-bromisatin-α-anilide, 4-methyl-5-bromo-7-chlorisatin-α-chloride, 4-methyl-5-bromo-7-chlorisatin-α-anilide.

Suitable components for making indigoid dyestuffs are, for example, the hydroxy-compounds of six-membered single or condensed ring systems, such as phenols, naphthols, hydroxyanthracenes, hydroxycarbazoles, as well as five-membered condensed ring systems, such as indoxyls, hydroxythionaphthenes, thionaphthenequinones, acenaphthenequinones, isatins of the benezene, naphthalene, anthracene and anthraquinone series. Also the reactive α-derivatives corresponding with these five-membered ring systems, such as, for example, isatin-α-halides, isatin-α-anilides, hydroxythionaphthene - α - anils, hydroxythionaphthene-α-carboxylic acids, hydroxythionaphthene-α-oximes. The components suitable for making indigoid dyestuffs may contain substituents, for instance alkyl- methoxy- or ethoxy-groups, or a halogen, for instance bromine or chlorine.

Indoxyls of the above general formula may be oxidized, for example in alkaline medium, with air or potassium ferricyanide; the indoxyls may be condensed with the components suitable for making indigoid dyestuffs in aqueous solution or suspension or in presence of a solvent, such as alcohol, benezene, chlorobenzene or tetrachlorethane; treatment with a halogenating agent, for instance bromine, chlorine or sulphuryl-chloride, is best conducted in a sulphuric acid solution or in presence of nitrobenzene or chlorobenzene.

The new dyestuffs are suitable for dyeing and printing animal and vegetable fibers, for instance wool, cotton or artificial silk from regenerated cellulose. They dye various tints characterized by high degree of purity, high coloring power and very good properties of fastness, for instance to chlorine and light; they can be converted by known methods into their leuco-ester salts.

The specified indoxyls or the corresponding isatins and their reactive α-derivatives may be made by the various known methods, for example the 4-methyl-7-chlorindoxyl or 4-methyl-5:7-dichlorindoxyl can be made by alkali fusion of the 2- chloro - 5 - methyl - phenylglycine - 6 - carboxylic acid or the 2:4-dichloro-5-methylphenylglycine-6-carboxylic acid respectively. The corresponding isatins, for instance 4-methyl-7-chlorisatin or 4-methyl-5:7-dichlorisatin may easily be obtained by the process of Sandmeyer (Helv. Chimica Acta vol. II, page 234) from 1-amino-2-chloro-5-methylbenzene or 1-amino-2:4-dichloro-5-methylbenzene respectively; further, the reactive α-derivatives corresponding with the said isatins may be made by various methods, for example, the 4-methyl-7-bromisatin-α-anilide or the 4-methyl-5:7-dibromisatin-α-anilide may be made according to the process of Sandmeyer (German patent specifications Nos. 115,169, 113,978, 113,980) from 1-amino-2-bromo-5-methylbenzene or 1-amino-2:4-dibromo-5-methylbenzene. Reactive α-chloride of 4-methyl-5-chloro-7-bromisatin is easily made by treating 4-methyl-7-bromisatin with phosphorus pentahalide and then the 4-methyl-7-bromisatin-α-halide thus produced with sulphuryl-chloride as described in application Serial No. 717,535 filed March 26, 1934.

The following examples illustrate the invention, the parts being by weight:—

Example 1

23.1 parts of 4-methyl-5:7-dichlorisatin are converted into the 4-methyl-5:7-dichlorisatin-α- chloride by heating them with 22 parts of phosphorus pentachloride in 300 parts of chlorobenzene and the product is mixed with a solution, at 60–70° C., of 15 parts of 3-hydroxythionaphthene in 300 parts of chlorobenzene. The dyestuff of the formula

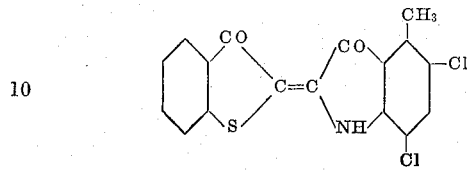

is obtained in the form of a blue-violet crystalline powder; it is filtered and washed with chlorobenzene and with alcohol. In concentrated sulphuric acid it dissolves to a green solution; it dyes cotton in a yellow vat strong reddish, fast blue tints.

Dyestuffs of similar properties are obtained when instead of the 4-methyl-5:7-dichlorisatin, 19.6 parts of 4-methyl-7-chlorisatin or 27.5 parts of 4-methyl-5-chloro-7-bromisatin are used.

Example 2

19.6 parts of 4-methyl-7-chlorisatin are converted into the 4-methyl-7-chlorisatin-α-chloride by heating them for an hour with 22 parts of phosphorus pentachloride and 400 parts of chlorobenzene at 95–100° C. The mass is then cooled to 55–60° C. and, after addition of 14 parts of sulphuryl chloride, stirred for 2–3 hours at 63–68° C. The mixture is now run into a solution of 18 parts of 4-chloro-1-hydroxynaphthalene in 500 parts of chlorobenzene at 45–50° C. and after stirring for half-an-hour at this temperature the liquid is cooled and filtered and the solid matter washed with chlorobenzene and dried.

The dyestuff thus obtained of the formula

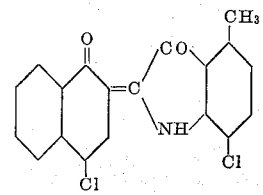

is a blackish, crystalline powder, soluble to a green solution in concentrated sulphuric acid; it dyes cotton in a green-yellow vat blue, fast tints.

Dyestuffs of similar properties are obtained if, instead of 4-chloro-1-hydroxynaphthalene 22.3 parts of 4-bromo-1-hydroxynaphthalene or instead of 4-methyl-7-chlorisatin 24 parts of 4-methyl-7-bromisatin are used.

Example 3

23.1 parts of 4-methyl-5:7-dichlorisatin are converted into the 4-methyl-5:7-dichlorisatin-α-chloride by heating them with 22 parts of phosphorus pentachloride in 300 parts of chlorobenzene. The product is mixed with a solution, at 60–70° C., of 19.9 parts of 4-methyl-6-chloro-3-hydroxythionaphthene in 300 parts of chlorobenzene. The dyestuff of the formula

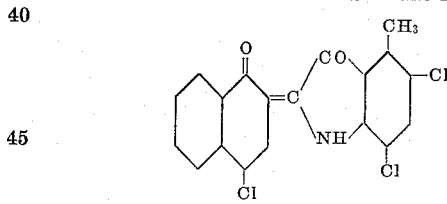

is thus obtained in the form of a red-violet, crystalline powder, which is filtered and washed with chlorobenzene and with alcohol; it then dissolves in concentrated sulphuric acid to a greenish solution. It dyes cotton in a yellow vat remarkably pure violet tints.

The same dyestuff is obtained by heating for several hours 4-methyl-6-chloro-3-hydroxythionaphthene with 4-methyl-5:7-dichlorisatin-2-anilide in glacial acetic acid under reflux, or by heating 4-methyl-5:7-dichlorindoxyl with 4-methyl-6-chlorothionaphthene-quinone-2-anil in glacial acetic acid.

Example 4

19.6 parts of 4-methyl-7-chlorisatin are converted into the 4-methyl-7-chlorisatin-α-chloride by heating them with 22 parts of phosphorus pentachloride in 300 parts of chlorobenzene; the product is mixed with a solution at 45–50° C. of 18 parts of 4-chloro-1-hydroxynaphthalene in 500 parts of chlorobenzene. The dyestuff of the formula

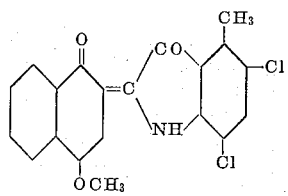

separates in the form of a dark blue, crystalline powder which is filtered and washed free from chlorobenzene by means of alcohol. It dissolves in concentrated sulphuric acid to a green solution and dyes cotton in a greenish-yellow vat fast blue tints.

The same dyestuff is obtained by heating for a short time 4-chloro-1-hydroxynaphthalene with 4-methyl-7-chlorisatin-2-anilide in acetic anhydride.

Example 5

23.1 parts of 4-methyl-5:7-dichlorisatin are converted into the 4-methyl-5:7-dichlorisatin-α-chloride by heating them with 22 parts of phosphorus pentachloride in 300 parts of chlorobenzene and the product is mixed with a solution at 45–50° C. of 18 parts of 4-methoxy-1-hydroxynaphthalene in 500 parts of chlorobenzene. The dyestuff of the formula

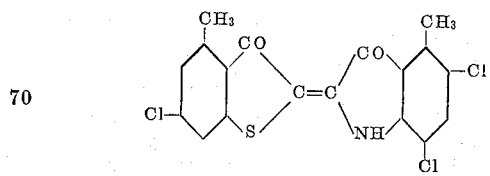

which is obtained in the form of a blue, crystalline powder is filtered and washed with chlorobenzene and with alcohol, it then dissolves in concentrated sulphuric acid to a green solution and dyes wool in a green-yellow vat pure blue tints. When cotton is printed with this dyestuff there are obtained pure blue prints fast to light and chlorine and of good night color.

If, instead of 4-methoxy-1-hydroxynaphthalene there are used 19 parts of 4-ethoxy-1-hydroxynaphthalene or instead of 4-methyl-5:7-dichlorisation 27.5 parts of 4-methyl-5-chloro-7-bromisatin dyestuffs of similar properties are obtained.

Example 6

An alkali melt containing 21.7 parts of 4-methyl-5:7-dichlorindoxyl is dissolved in 400 parts of water and oxidized by blowing air through the solution. The dyestuff of the formula

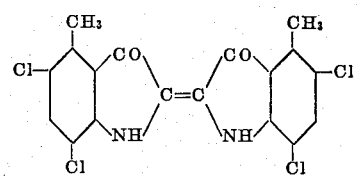

which separates in the form of a blue powder is filtered, washed and dried. It dissolves in concentrated sulphuric acid to a green solution and dyes cotton in a yellow vat pure blue tints.

The same dyestuff is obtained if a 4-methyl-5:7-dichlorisatin-α-anilide is reduced in known manner in an alcoholic solution with ammonium sulphide.

*Example 7*

Into a solution of 20 parts of 2:1-naphththio-indoxyl in 500 parts of chlorobenzene at 75–80° C. there is run a solution of 4-methyl-5:7-dichlorisatin-α-chloride made by heating 23.1 parts of 4-methyl-5:7-dichlorisatin with 22 parts of phosphorus pentachloride and 400 parts of chlorobenzene. By cooling and filtering the dyestuff of the formula

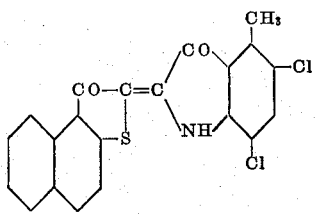

which separates and washing the latter with chlorobenzene and with alcohol there is obtained a blackish powder which dissolves in concentrated sulphuric acid to a blue solution and dyes cotton in an orange vat violet brown, very fast tints.

A dyestuff having similar properties is obtained if instead of 4-methyl-5:7-dichlorisatin there are used 27.5 parts of 4-methyl-5-chloro-7-bromisatin.

*Example 8*

Into a solution of 20 parts of 1:2-naphth-thioindoxyl in 500 parts of chlorobenzene, at 75–80° C., there is run a solution of 4-methyl-7-chlorisatin-α-chloride, made by heating 19.6 parts of 4-methyl-7-chlorisatin with 22 parts of phosphorus pentachloride and 400 parts of chlorobenzene. After cooling, filtering and washing with chlorobenzene as well as with alcohol, the dyestuff of the formula

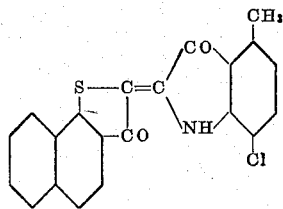

is obtained in the form of a blackish powder, which dissolves in concentrated sulphuric acid to a green-blue solution and dyes cotton in an orange vat brown-violet tints of good fastness.

*Example 9*

23.1 parts of 4-methyl-5:7-dichlorisatin are converted into the 4-methyl-5:7-dichlorisatin-α-chloride by heating them with 22 parts of phosphorus pentachloride in 300 parts of chlorobenzene and the product is mixed with a solution at 75–80° C. of 20 parts of 1:2-naphththioindoxyl in 500 parts of chlorobenzene. The dyestuff of the formula

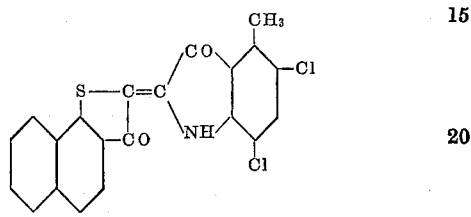

separates in the form of a violet powder; it is soluble in concentrated sulphuric acid to a green-blue solution and dyes cotton in an orange vat fast violet tints.

A dyestuff of similar properties is obtained when instead of 4-methyl-5:7-dichlorisatin there are used 27.5 parts of 4-methyl-5-chlor-7-bromisatin.

What we claim is:—

1. Indigoid dyestuffs of the general formula

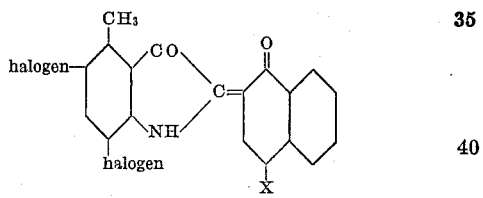

wherein X is a member of the group consisting of halogen and —OR, the R representing a lower alkyl radical, which dyestuffs are blue to dark blue to blackish powders dissolving in concentrated sulphuric acid to green solutions and dyeing cotton blue tints of good fastness.

2. The indigoid dyestuff of the formula

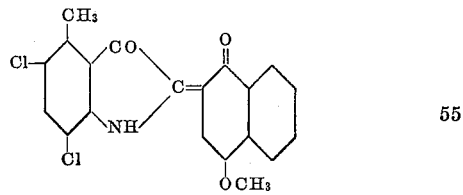

which dyestuff is a blue powder dissolving in concentrated sulphuric acid to a green solution and dyeing cotton pure blue tints of good fastness, and which is suitable for printing cotton.

ERNST STOCKLIN.
EDUARD KAMBLI.